Patented June 4, 1929.

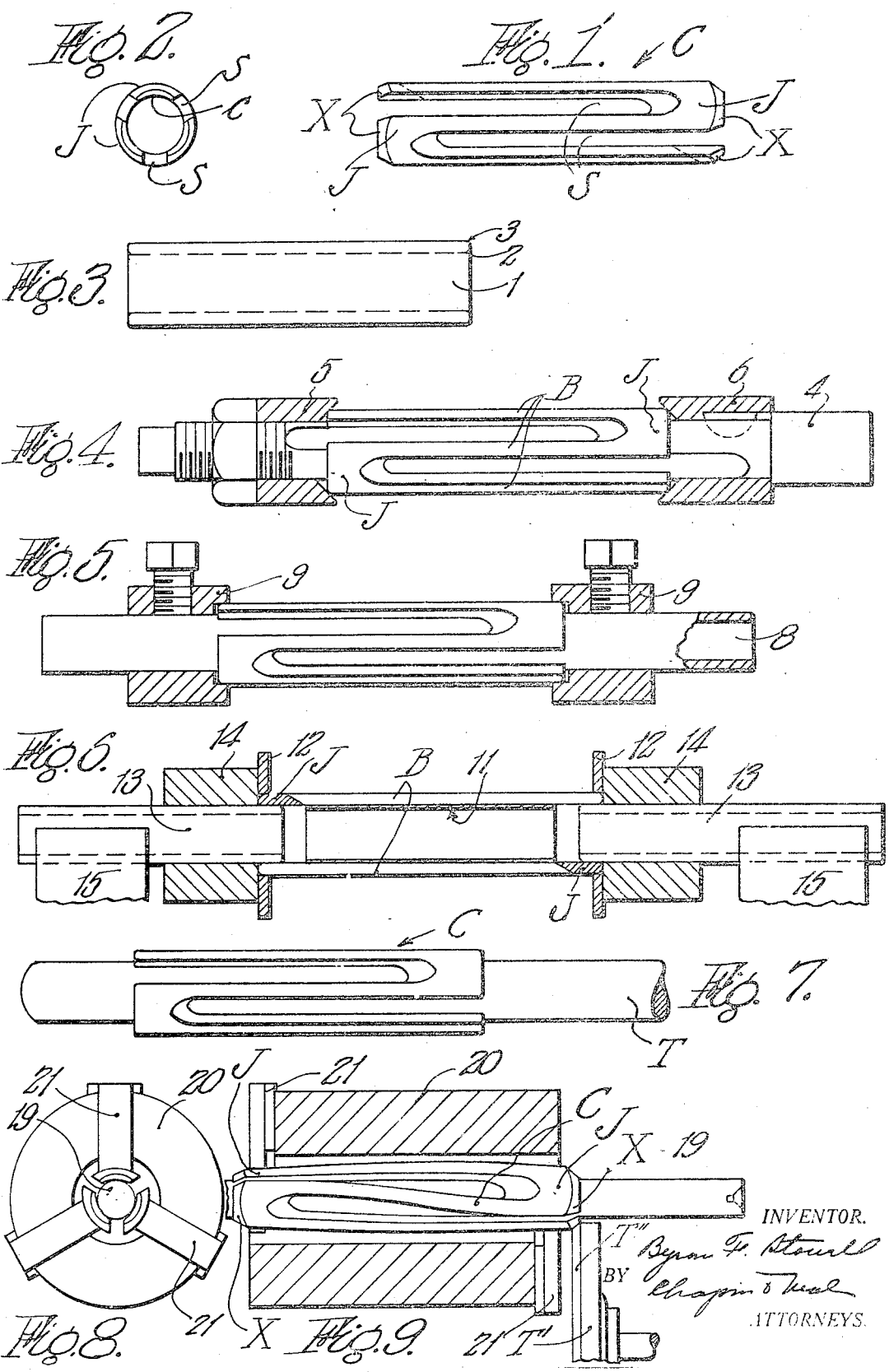

1,716,331

UNITED STATES PATENT OFFICE.

BYRON F. STOWELL, OF SPRINGFIELD, MASSACHUSETTS, ASSIGNOR TO VAN NORMAN MACHINE TOOL COMPANY, OF SPRINGFIELD, MASSACHUSETTS, A CORPORATION OF MASSACHUSETTS.

METHOD OF MAKING COLLETS.

Application filed February 9, 1928. Serial No. 253,184.

This invention relates to improvements in the method of making double ended split collets, and is a continuation in part of my pending application Ser. No. 246,011, filed January 11, 1928.

Double ended split collets of the type to which the invention relates, consist of a cylindrical hollow or tubular member of steel provided with longitudinal slots through the walls thereof which extend alternately from opposite ends of the collet to points adjacent the other end to provide or form a series or set of jaws at each end of the collet. The jaws of one end of the collet are thus connected by bar portions (the portions of the wall of the tube between the slots) to the jaws at the other end of the collet. The bar portions, depending upon their flexibility, permit the jaws at opposite ends of the collet to be contracted or moved towards one another for gripping or embracing objects of various sizes passing through the collet. The collet is carried in a hollow spindle and the sets of jaws are moved towards one another or are contracted so as to grip an object by a pair of relatively movable cone or socket members associated with the spindle. These members are arranged for axial movement towards or away from one another and are adapted to engage or embrace outer surfaces of the jaws of the collet and cam or press them inwardly or towards one another so that their inner surfaces grip or embrace an object passing through the collet.

Collets of the prior art were not required to be adapted for gripping objects which vary through as great a range of sizes as the present-day practice and, therefore, did not call for the degree of flexibility as is now required, so that a collet was made from a grade of steel which did not require hardening, tempering, etc., as is at present necessary in order to provide a collet which is satisfactory for the present-day purposes.

The requirements now call for a collet of this type which has an extreme degree of flexibility and is capable of retaining its normal expanded form to receive a shaft or objects say of $\frac{1}{2}''$ or $\frac{9}{16}''$ diameter and also capable of contacting to hold a much smaller shaft or article of $\frac{5}{16}''$ or less diameter and to hold in correct axial alignment shafts or objects of any intermediate diameters between the normal expanded capacity and the minimum contracted capacity (say $\frac{5}{16}''$, $\frac{3}{8}''$, $\frac{7}{16}''$, $\frac{1}{2}''$, or $\frac{9}{16}''$) and hold for rotation shafts such as the stems of automobile valves of any diameter between the maximum and minimum capacity of the collet and all with the utmost degree of axial precision.

In order to provide the extreme degree of flexibility required for the range intended, and permit the collet to resume its full normal expanded form, and at the same time to maintain the degree of extreme accuracy required, it has been found necessary to harden and accurately form the jaws and to so temper the connecting bars that the collet will have the necesary degree of resiliency or flexibility to permit its proper functioning, when holding for rotation with uniform axial precision all objects or shanks of any diameter within the range between its maximum and minimum bore capacity.

Therefore, a collet of the class described must possess certain characteristics, which are briefly as follows:

The internal bore of the collet, more particularly the interior of the jaws, must be provided with internal article gripping surfaces which are concentrically disposed so that an article is gripped at equal distant points about its periphery in order that the article may be held and rotated on a true axis or so that its axis coincides with the axis of rotation of the collet. The bars connecting the jaws at opposite ends of the collet must possess sufficient flexibility so as to permit a free clamping movement of the jaws as they are moved inwardly to engage an article passing through the collet and must not in any way throw the jaws out of alignment or disturb their relative position as they are forced about articles of various sizes. The outer surfaces of the jaws which are engaged by the actuating cone members must be accurately formed so that as the jaws are engaged they are not twisted relative to one another but are moved uniformly into clamping position to enable them to accurately hold the object on its true axis.

Accordingly, the novel features of my invention are directed to improvements in the method of producing collets of the class described which will possess the necessary desirable characteristics referred to and its objects are accomplished by means of the novel features of the method to be described. It will be understood that various forms of apparatus may be employed in practicing the invention without departing from the scope thereof, and that the form shown is merely for the purposes of disclosure.

In the drawings:

Figs. 1 and 2 are side and end elevational views of a collet having the desired novel features and formed by the novel steps of the method of the invention;

Fig. 3 is a side elevational view of a tube to be employed for making the collet;

Fig. 4 is a side elevational view of a support and collet which has been cut with its longitudinal slots;

Fig. 5 is a view of an arbor and collet preparatory to a heat treating operation;

Fig. 6 is a similar view of an arbor and collet as it appears after another heat treating operation;

Fig. 7 is a view of an arbor and collet arranged for a lapping operation; and

Figs. 8 and 9 are end and longitudinal sectional views showing how the collet is held for the forming of its external cone engaging faces.

Referring now to the drawings in detail, the novel method of producing a collet such as C will be described.

First, a tube 1 is produced by boring or reaming a cylindrical bar of suitable steel which of course may be cut to any desired length, the diameter of the bore being preferably such as will accommodate a piece of work which corresponds to the largest diameter of the range for which the collet is intended. The ends of the tube may be chamfered as at 2 and 3, if desired.

Next, the tube is slotted lengthwise and from opposite ends and according to one novel feature of the invention, in order to prevent a distortion of the collet during this operation, it is supported on and carried by an arbor 4 which fits the bore thereof, while its ends are held against the arbor and confined or embraced by clamping members 5 and 6 which are adjustable on said arbor. These members 5 and 6 are provided with surfaces which engage the peripheral edges of the tube at the ends thereof so that when the tube is forced against the member 6 by the member 5, both ends of the tube are confined or embraced by the members and held against springing outwardly or from a relative shifting around the arbor. The arbor may be held against rotation in any suitable support and the clamping members and arbor may be slotted so that as the arbor is held against rotation, a milling cutter may be moved longitudinally thereof to form the slots S in the walls of the tube to provide jaws J at opposite ends of the tube which are connected by bar portions B between the slots. By thus supporting the bar for the slotting operation by an arbor of suitable size and by confining the opposite ends of the tube during this operation, it is suitably held and supported against any distorting tendency so that when finally slotted it has a true outer and inner diameter with a set or series of jaws on its opposite ends which are spaced uniformly and which will bear uniformly on an object.

Owing to the double end split form of the collet, it would be difficult to accurately grind the bore after hardening as is the common practice in hardening a collet split at one end only. In order to adapt the collet so it will hold arbors or stems of any size within its full flexing capacity, it is of the utmost importance that the bore of the collet be held through the various steps of slotting, hardening, and tempering so it retains as nearly as possible a true cylindrical form when at its full normal expansion.

After hardening and tempering, the collet ends are formed or generated when contracted and held on a true running arbor or plug of approximately the minimum size. Under this condition the arbor upon which the collet is ground, or the stem or arbor of similar diameter which will be held in the collet, will have a relatively narrow contact in the center of each jaw, while the outer contact of each jaw in its contracting cone will have a relatively full cylindrical contact around the outer face of each jaw.

If the diameter of the arbor or stem to be held by the collet is increased, the point of contact within the jaws is widened and the outer contacting surface of the jaw, in the cone, is correspondingly narrowed. When an arbor or stem of the full diameter is held, it has a relatively full contact within the bore on each jaw, while the outer contact is relatively narrow at a spot near the center of each jaw.

As before stated, the grinding of the outer end cone contacting surface of the jaws, as will later be explained, is done when the jaws are contracted on a small arbor and contact or touch in the bore at a narrow point in each jaw. It is obvious that any appreciable flexing or twisting of any one of the jaws in the process of hardening or tempering, will cause this jaw under the closing pressure to more or less adjust itself to the true cylindrical form of the arbor when holding the larger arbors, and this tends to throw both the bore contact and the outer contact away from the original true grinding contact and destroys the axial alignment of the collet when holding larger diameter pieces.

It is therefore necessary to employ suitable means to prevent any distortion of the collet jaws or connecting bars throughout the various processes of hardening and tempering, in order to enable the collet to hold shanks of various diameters within its capacity and in uniformly correct axial alignment.

Since the inner surfaces of the collet, particularly the jaws on opposite ends of the tube, are to be formed to bear upon and grip an object and are to be engaged by and actuated by a cone or socket member on their outer surfaces, it is necessary that the jaw portions be heat treated, as by hardening, to facilitate the forming operations and to provide jaw portions which are sufficiently hard to stand up under the strains to which they are to be subjected. To prevent distortion during the heat treating, which would take place under ordinary conditions, the collet is supported on a hollow arbor 8 which preferably is a snug fit for the bore of the arbor, and its ends are confined between relatively adjustable clamping members 9 carried at opposite ends thereof. These members 9 have suitably formed recesses for receiving and embracing the ends of the jaws J of the collet and are adjustable for clamping the jaws so as to prevent any relative shifting or expanding movement thereof, either about the arbor or away therefrom, while of course the collet may elongate by action of the heat. The arbor and collet are heat treated in any of the well-known ways to provide the desired degree of hardness, and when removed from the arbor it is in a true unwarped or undistorted condition, since it has been suitably supported and held against any springing tendency.

To provide flexibility for the connecting bars B, so that the jaws may be moved for clamping or gripping an object without being thrown out of alignment during their movement, they are spring tempered according to the following step of the method (see Fig. 6).

A metal tube 11 is first inserted in the collet, which has relatively thin walls and is of a length less than that of the collet. The jaws at the ends of the collet are inserted in annular slots formed between rings 12 and the ends of tubular arbors 13 which are fixed to members 14 that support the said rings. The arbors are placed in spaced apart supports such as V-blocks 15 so that they may be moved towards one another to engage and support the ends of the collet and so that they may be rotated if desired while the tube and collet are heated by some convenient means such as a blow torch or the like. When heated to the desired spring tempering heat, the parts are quenched, as is usual practice, in some suitable quenching liquid, as is customary in spring tempering practice to produce the desired degree of spring tempering effect.

While the collet is being heated, as described, the tube not only tends to absorb and transfer heat to the connecting bars of the collet but supports the bars against collapsing, which collapsing would cause a distortion or displacing of the jaws and a reduction in the internal diameter of the collet, and, as distinguished from a collapsing of the bars, there may be a tendency for them to bulge slightly outwardly, which is not objectionable, so that in some cases the bore of the collet may be slightly larger at its center than at its ends. Also the members 12, 13, and 14, which support and confine the ends of the collet, serve to absorb heat and in effect prevent the ends of the previously hardened jaws being heated, which would impair the effects of the former hardening operation.

The tempering operation provides the desirable flexibility for the bars B, while they as well as the jaw portions J, are held against relative movement during this step of the method.

In order to provide a true concentric bore for the collet, it is slipped over a rotating lapping tool T and the jaws J at opposite ends of the collet are grasped by the hands and urged inwardly onto the tool. The tool may be in the form of a metal rod the size of, or slightly smaller than, the bore of the collet and charged with abrasive material of some sort and held by a rotating chuck or the like. The lapping operation produces concentric article gripping surfaces c at the jaw portions of the collet, and will provide similar surfaces wherever the bore of the collet contacts with the tool.

Finally, the external cone engaging surfaces of the jaws are generated after the following manner. A mandrel or arbor 19 representing the smallest size of the range for which the collet is intended is passed therethrough and the jaws at opposite ends of the collet are clamped therearound by being forced inwardly by a chuck 20 which has movable jaws 21 adapted to be moved inwardly to bring each of the jaws of the collet into gripping or clamping engagement with the arbor 19. The chuck may take any form desired and will be of such a length as will allow the ends of the jaws of the collet to project from opposite sides thereof, as shown. The arbor is then rotated in some suitable manner, as between centers of a lathe or the like, and a rotatable tool T', which may be a grinding wheel having an angular or curved cutting edge T', is caused to operate against the outer surfaces of the jaws at either end of the collet so as to provide the beveled outer surfaces X, as shown.

It is to be noted that the jaw forming operation may be carried out before the spring tempering operation, if desired, or even before the jaws are hardened. This of course will depend on the grade of material used or on the uses for which the collet will be put.

As the jaws are thus contracted onto an arbor of small diameter, the generated surfaces are concentric with an arbor of this size but obviously it may be desired to provide surfaces which are concentric with an arbor of any other size within the range, so as to provide outer surfaces which will operate with the cone members to effect an opening and closing movement of the jaws about articles of different sizes, as described.

Various changes may be made in the method described in order that it may be practiced in connection with various collets and the like, so that the detailed description of the invention is not intended to be a limitation to any particular arrangement of steps or apparatus.

What I claim is:

1. The method of producing a double ended split collet which consists in supporting a metal tube on an arbor, confining its ends against displacement, and slotting and hardening the said tube, in lapping the bore of said collet by contracting the same about a cylindrical abrasive tool and then in forming the outer surfaces of its jaws while they are contracted and held about an arbor.

2. The method of producing a double ended split collet which consists in supporting a metal tube on an arbor and confining its ends against displacement and in slotting said tube at opposite ends thereof while so confined, hardening said slotted tube while its ends are supported against internal and external distortion, and in forming the outer end surfaces of its jaws while they are contracted and held for rotation on an arbor.

3. The method of producing a double ended split collet which consists in slotting a tube while it is supported by an arbor and has its ends confined against displacement, hardening said slotted tube while it is supported by an arbor and has its ends confined against displacement, and then in tempering said hardened tube while its opposite ends are confined and supported against displacement and the portions intermediate its ends internally supported against collapsing by a cylindrical metal member.

4. The method of producing a double ended split collet which consists in slotting a tube while it is supported by an arbor and has its ends confined against displacement, hardening said slotted tube while it is supported internally by an arbor and has its ends confined against relative displacement, tempering said hardened tube while its opposite ends are supported against displacement and the portions intermediate its ends internally supported against collapsing, and in lapping the bore of said collet by compressing the same about a rotating abrasive tool.

5. The method of producing a double ended split collet which consists in slotting a tube while it is supported by an arbor and has its ends confined against displacement, hardening said slotted tube while it is supported internally by an arbor and has its ends confined against relative displacement, tempering said hardened tube while its opposite ends are supported against displacement and the portions intermediate its ends internally supported against collapsing, and in forming the outer end surfaces of the jaw portions of said collet by grinding as the said jaws are contracted and held against an arbor, the diameter of which is relatively less than the normal bore of the collet.

6. The method of producing a double ended split collet which consists in slotting a metal tube longitudinally thereof to provide sets of spaced jaws at opposite ends thereof, which are connected by bar portions, and in heat treating said collet while the jaws are confined against relative movement and the bar portions internally supported against collapsing.

7. The method of producing a double ended split collet which consists in slotting a metal tube longitudinally thereof to provide sets of spaced jaws at opposite ends thereof, which are connected by longitudinal bar portions, in heat-treating said jaws, and in forming the outer end surfaces of said jaws by grinding while they are contracted and held onto an arbor having a diameter which is relatively less than the normal internal diameter of the collet.

8. The method of producing a double ended split collet which consists in slotting a metal tube longitudinally thereof to provide sets of spaced jaws at opposite ends which are connected by longitudinal bar portions, heating the bar portions while they are internally supported and the jaw portions thereof confined against relative displacement and in forming the outer surfaces of the jaw portions while they are held in contracted relation on an arbor which is less in diameter than the normal bore of the collet.

In testimony whereof I have affixed my signature.

BYRON F. STOWELL.